United States Patent
Robinson et al.

(10) Patent No.: US 8,248,684 B2
(45) Date of Patent: Aug. 21, 2012

(54) CONTROL OF ADAPTIVE OPTICS BASED ON POST-PROCESSING METRICS

(75) Inventors: M. Dirk Robinson, Menlo Park, CA (US); David G. Stork, Portola Valley, CA (US)

(73) Assignee: Ricoh Co., Ltd., Tokyo (JP)

( * ) Notice: Subject to any disclaimer, the term of this patent is extended or adjusted under 35 U.S.C. 154(b) by 465 days.

(21) Appl. No.: 12/198,765

(22) Filed: Aug. 26, 2008

(65) Prior Publication Data

US 2010/0053411 A1  Mar. 4, 2010

(51) Int. Cl.
 G02B 26/00 (2006.01)
 G02B 26/08 (2006.01)
(52) U.S. Cl. ........................................ 359/290
(58) Field of Classification Search .......... 359/618–621, 359/626, 443, 454–455, 244–245, 392, 405, 359/290–292, 223–225, 262–263, 295, 198, 359/298, 301–303, 317–318; 351/200, 205, 351/210–212, 221
See application file for complete search history.

(56) References Cited

U.S. PATENT DOCUMENTS

| | | | |
|---|---|---|---|
| 4,987,607 A * | 1/1991 | Gilbreath et al. | ............. 398/119 |
| 5,227,890 A | 7/1993 | Dowski, Jr. | |
| 5,521,695 A | 5/1996 | Cathey, Jr. et al. | |
| 5,748,371 A | 5/1998 | Cathey, Jr. et al. | |
| 5,870,179 A | 2/1999 | Cathey, Jr. et al. | |
| 6,021,005 A | 2/2000 | Cathey, Jr. et al. | |
| 6,069,738 A | 5/2000 | Cathey, Jr. et al. | |
| 6,525,302 B2 | 2/2003 | Dowski, Jr. et al. | |
| 6,842,297 B2 | 1/2005 | Dowski, Jr. | |
| 6,873,733 B2 | 3/2005 | Dowski, Jr. | |
| 6,911,638 B2 | 6/2005 | Dowski, Jr. et al. | |
| 6,940,649 B2 | 9/2005 | Dowski, Jr. | |
| 7,203,552 B2 * | 4/2007 | Solomon | ......................... 700/10 |
| 7,283,251 B1 * | 10/2007 | Tansey | ......................... 356/512 |
| 7,333,215 B2 | 2/2008 | Smith | |
| 2002/0118457 A1 | 8/2002 | Dowski, Jr. | |
| 2002/0195548 A1 | 12/2002 | Dowski, Jr. et al. | |
| 2003/0057353 A1 | 3/2003 | Dowski, Jr. et al. | |
| 2003/0169944 A1 | 9/2003 | Dowski, Jr. et al. | |
| 2003/0173502 A1 | 9/2003 | Dowski, Jr. et al. | |

(Continued)

OTHER PUBLICATIONS

Cathey, W. Thomas et al., "New Paradigm for Imaging Systems," Applied Optics, Oct. 10, 2002, pp. 6080-6092, vol. 41.

(Continued)

Primary Examiner — Dawayne A Pinkney
(74) Attorney, Agent, or Firm — Fenwick & West LLP

(57) ABSTRACT

Adaptive optics (AO) elements in imaging system allow dynamic and precise control over the optical wavefront to reduce uncontrolled wavefront errors in imaging systems. Traditional control of such devices is based on inverting the wavefront function to minimize the RMS wavefront error. However, this approach is not always optimal, particularly when the wavefront error is near or exceeds the limit of the AO element's correction capability. In the current approach, the AO element is instead controlled based on a performance metric that takes into account image processing, and not just RMS wavefront error.

19 Claims, 6 Drawing Sheets

U.S. PATENT DOCUMENTS

| | | |
|---|---|---|
| 2004/0145808 A1 | 7/2004 | Cathey, Jr. et al. |
| 2004/0190762 A1 | 9/2004 | Dowski, Jr. et al. |
| 2004/0228005 A1 | 11/2004 | Dowski, Jr. |
| 2004/0257543 A1 | 12/2004 | Dowski, Jr. et al. |
| 2005/0088745 A1 | 4/2005 | Cathey, Jr. et al. |
| 2005/0197809 A1 | 9/2005 | Dowski, Jr. et al. |
| 2005/0264886 A1 | 12/2005 | Dowski, Jr. |
| 2006/0285002 A1 | 12/2006 | Robinson et al. |
| 2007/0081224 A1 | 4/2007 | Robinson et al. |

OTHER PUBLICATIONS

Conan, J-M. et al., "Deconvolution of Adaptive Optics Images with Imprecise Knowledge of the Point Spread Function: Results on Astronomical Objects," 1998.

Maeda, Peter Y. et al., "Integrating Lens Design with Digital Camera Simulation," 5678 SPIE Proceedings SPIE Electronic Imaging, Feb. 2005, pp. 48-58, San Jose, CA.

* cited by examiner 1 contour = 0.75 waves 1 contour = 0.50 waves 1 contour = 0.70 waves 1 contour = 1.00 waves 1 contour = 1.00 waves 1 contour = 1.00 waves

CONTROL OF ADAPTIVE OPTICS BASED ON POST-PROCESSING METRICS

BACKGROUND OF THE INVENTION

1. Field of the Invention

This invention relates generally to the control of adaptive optics used in imaging systems.

2. Description of the Related Art

Adaptive optics (AO) elements such as deformable mirrors or liquid crystal spatial light modulators allow rapid and precise control over an optical wavefront by shifting the phase of the incoming beam of light passing through the optical system. Adaptive optics elements are currently employed to correct uncontrolled wavefront errors arising from turbulent media (as in telescopic imaging), or random media such (as in microscopy and imaging of the human retina).

Conventionally, the adaptive optics element imparts the conjugate of the phase error in the wavefront so as to cancel out the wavefront error in a process known as phase conjugation. For example, an incoming aberrated wavefront reflects off a deformable mirror. The mirror's shape is controlled by an array of actuators so that the mirror cancels the aberrations in the incoming wavefront. The reflected wavefront then has no wavefront error.

In a typical application of adaptive optics, the actuators adjust the shape of the variable phase element in order to minimize the RMS wavefront error. When the incoming wavefront error is small, the adaptive optics element can completely correct the incoming beam. All adaptive optics elements, however, have a limited range of operation. There is a physical limit to the amount and speed at which a deformable surface can be deformed. For example, one commercial deformable mirror device is limited to a height deviation between neighboring pistons of 2 to 3 microns. This restriction on motion presents several problems when trying to correct severely aberrated wavefronts. On the other hand, LC-SLM devices typically have slower response times and can correct only small phase errors. For all of these devices, the traditional control of AO systems based on minimizing the RMS wavefront error breaks down when encountering large wavefront errors that cannot be fully compensated by the AO element.

Thus, there is a need for AO controllers that can provide good correction, even when the AO element is not capable of compensating fully for wavefront errors.

SUMMARY OF THE INVENTION

The present invention overcomes the limitations of the prior art by controlling an AO element based on a post-processing performance metric, rather than based on the intermediate wavefront error. The performance metric is post-processing in the sense that it takes into account image processing applied to the captured images.

In one approach, an imaging system includes optics, an image capture device and image processing. The optics include adaptive optics. The optics form an image of an object. The image capture device captures the image formed by the optics. The image processing processes the captured images. The controller for the adaptive optics does not control the adaptive optics element using the conventional approach of minimizing wavefront error. Rather, it controls the adaptive optics based directly on a post-processing performance metric that accounts for propagation of the object through the optics, the image capture device and the image processing. For example, it might control the adaptive optics element with a goal of minimizing mean square error between an ideal image and the actual digital image after image processing. This approach can result in an intermediate optical image that is worse in image quality than the conventional image formed when the adaptive optics is controlled to minimize wavefront error, but which is better after image processing.

Other aspects of the invention include methods corresponding to the devices and systems described above.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
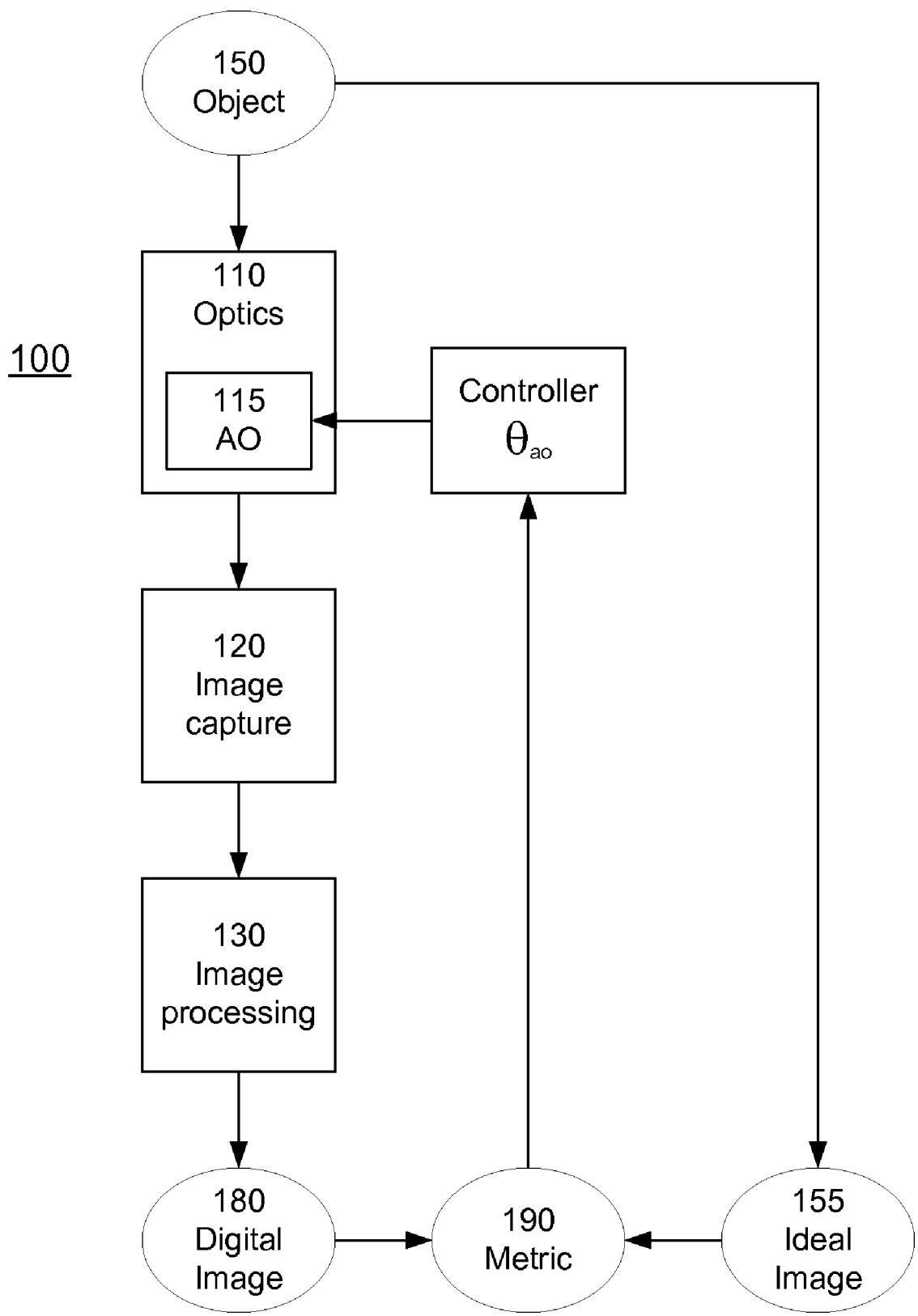
FIG. 1 is a block diagram of a system according to the present invention.

FIG. 1 is a block diagram illustrating the control of adaptive optics within an imaging system 100. The imaging system 100 includes optics 110, image capture device 120 and image processing 130. The imaging system 100 is intended to image an object 150 and produces digital image 180. The optics 110 includes adaptive optics 115, which can be used to adjust the wavefront of the incoming optical beams. The general problem is to control the adaptive optics 115 in a manner that "optimizes" the system's overall performance, subject to certain constraints. In FIG. 1, the goal of optimization is to produce a digital image 180 which matches the ideal version 155 of the input object 150.

In adaptive optics, some object or other source is used to provide feedback for the adaptive optics. This object will be referred to as the probe object or probe source. For example, the probe object may be a natural or synthetic guide star, or some other point source. It may also be an optical beam that interrogates the aberrations along the optical path for the imaging system 100. The object 150 being imaged may or may not be the same as the probe object.

Figure 2:
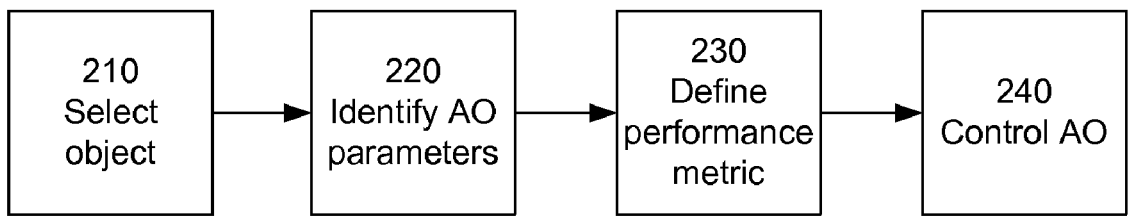
FIG. 2 is a block diagram of an AO control method according to the present invention.

FIGS. 1 and 2 illustrate an example method for controlling the adaptive optics 115 according to the present invention. Referring to FIG. 2, the control method includes selecting 210 an object(s) 150 to be imaged. Although the selected object 150 may be used in its physical form, in an alternate approach, a spatial model of the object is used instead. Models can be tailored for a specific situation, empirically measured, based on previously developed models and/or otherwise provided. Illumination, radiometry and geometry are factors that may be reflected in the object model. The spatial model of the object preferably includes a statistical model of the object. Further examples will be described below and are described in U.S. patent application Ser. No. 11/155,870, "End to End Design of Imaging systems," filed Jun. 17, 2005 by M. Dirk Robinson and David G. Stork, which is incorporated herein by reference.

The parameter space for the adaptive optics is also defined 220, either expressly or implicitly. For example, a certain deformable mirror may have N actuators that each may be moved throughout a certain range of travel, but subject to the constraint that the mirror surface itself will limit the relative positioning of adjacent actuators.

In FIG. 1, the parameter space for the adaptive optics is defined by $\theta_{ao}$. Parameter spaces for other parts of the optics, image capture device and image processing may also be defined. $\Theta$ will be used to denote the entire parameter space. For example, the optics may allow adjustment of zoom or aperture, the image capture device may allow adjustment of acquisition time (electronic shutter) or sensitivity, and the image processing may allow adjustment of filter coefficients. Other parameters will be apparent. Various non-imaging constraints or costs 170 may also be defined. The overall size of the possible parameter space for the imaging system will vary depending on the application. In some cases, there may be much latitude in adjusting the imaging system. In other cases, there may be little or no adjustment possible.

A post-processing performance metric 190 is also defined 230. The performance metric is post-processing in the sense that it is based on performance after image processing rather than before image processing. For examples, measures of the wavefront error or spot size of the intermediate optical image produced by the optics alone may be conventional error metrics for the optics but they are not post-processing performance metrics. In FIG. 1, the post-processing performance metric 190 is based on a comparison of the digital image 180 produced by the imaging system 100 compared to the ideal digital image 155.

In many situations, the image 180 is determined based on propagation of the selected object through the imaging system 100 (including image processing 130). The propagation may be actual, simulated or modeled, or a combination. For example, actual propagation through the optics (including atmospheric turbulence) can be determined by observing the captured images and/or the adaptive optics. As an example of a mixed approach, aberrations of the atmospheric turbulence may be based on actual propagation through the atmosphere, but subsequent "propagation" through a lens system may be based on a model of the lens system constructed on a computer. The model may be based on measuring the actual lens system. Alternately, it can be based on the design documents for the lens system. In the modeling approach, the optics may be modeled, for example, by the modulation transfer function (MTF).

The control step 240 can be described as selecting the adaptive optic parameters $\theta_{ao}$ that optimizes the post-processing performance metric 190, possibly subject to certain constraints (e.g., limits on certain costs 170). Note that the control of the adaptive optics 115 takes into account subsequent image processing 130. In some cases, the adaptive optics 115 and image processing 130 may be adjusted together. For example, filter coefficients may be changed for different levels of turbulence and degrees of adaptive optics compensation. Mathematically, using the notation of FIG. 1, the control step can be described as selecting the parameters $\Theta$ (including $\theta_{ao}$) to directly optimize the post-processing performance metric, possibly subject to certain constraints on the costs 170.

A number of optimization algorithms can be used. For some linear cases, parameters may be solved for analytically or using known and well-behaved numerical methods. For more complicated cases, including certain nonlinear cases, techniques such as expectation maximization, gradient descent and linear programming can be used to search the design space.

Note that in both FIGS. 1 and 2, there is no requirement for the optics 110, the image capture device 120 or the image processing 130, taken alone, to be optimal. It is quite possible for these subsystems to exhibit less than optimal performance when considered alone, while the overall imaging system 100 still exhibits good or even optimal performance. This is in direct contrast to conventional AO control methods where the optics 110 and adaptive optics 115 typically are adjusted by directly optimizing the image quality of the intermediate optical image formed by it. Most often, the adaptive optics 115 are controlled to directly minimize the RMS wavefront error of the probe object. In contrast, for the adjustment approach of FIG. 2, the intermediate optical image (of object 150, not the probe object) formed by the optics 110 may have worse image quality (e.g., as measured by wavefront error), which is then corrected by the image processing 130. The adaptive optics 115 is not controlled based directly on minimizing wavefront error. Rather, it is controlled based directly on optimizing the post-processing performance metric 190.

Figure 3:
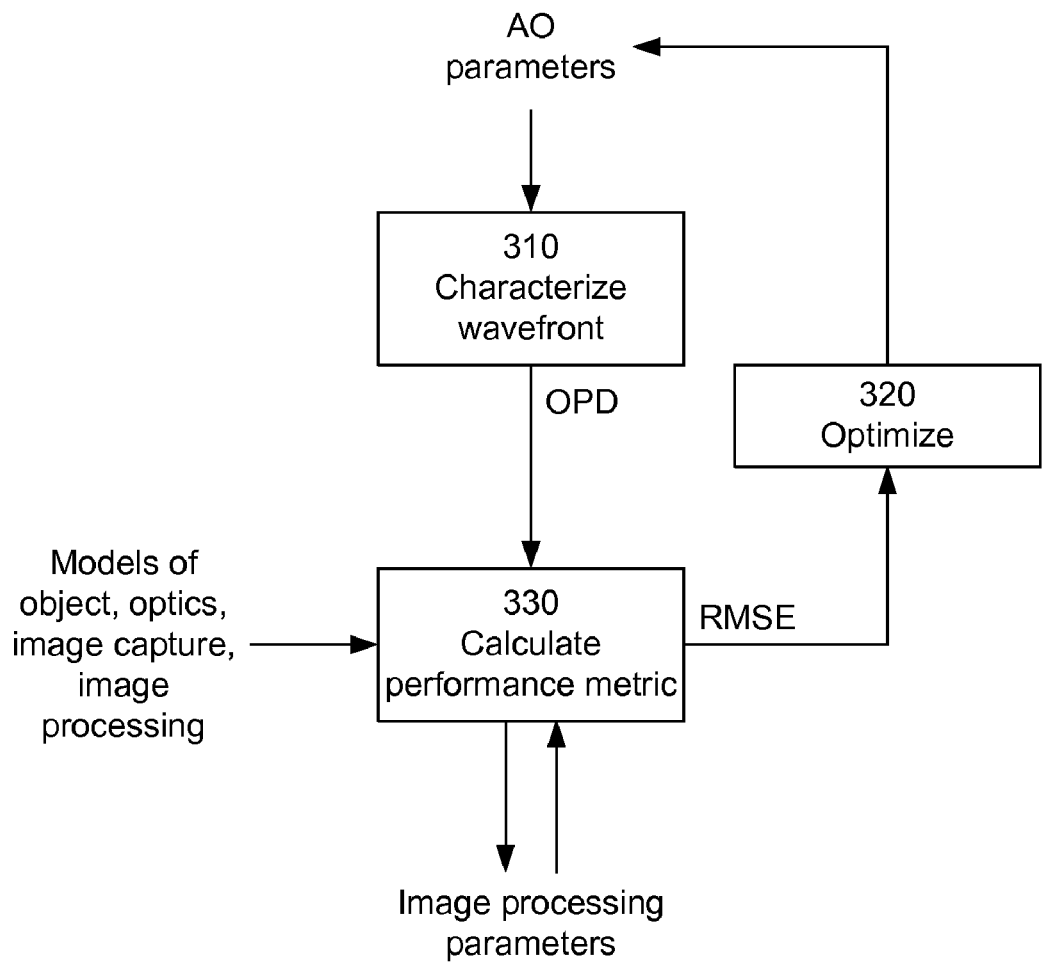
FIG. 3 is a block diagram illustrating one example AO control method.

FIG. 3 illustrates one example AO control method. Adaptive optics systems typically include some sort of wavefront sensor to characterize 310 the shape of the incoming wavefront, which in turn is a characterization of the optics. In this particular example, the optics is characterized by the wavefront error or optical path difference (OPD) measured by the AO wavefront sensor. Another common characterization of optics is the optical transfer function (OTF) or modulation transfer function (MTF). The MTF can be determined in a number of different ways, including by well-known transformation of the wavefront error measured in step 310.

In step 330, the post-processing performance metric is determined based on the object to be imaged, the probe object, the image capture device and the optics. In this particular example, the performance metric is the root mean square error between a simulated image and an ideal image, as will be described in greater detail below. The simulated image is determined by simulating the propagation of an object through the optics (based on the OPD and corresponding MTF characterization, determined from the probe object), the image capture device and the image processing. Optionally, models of various components in the imaging system may be used to facilitate simulating the propagation of an object through the imaging system.

Step 330 may have self-contained loops or optimizations. In this example, the image processing is adjusted for each new OPD and this process may or may not be iterative. Step 330 outputs the post-processing performance metric, which is used in step 320 to iterate the adjustment of the adaptive optics element. Note that the adjustment of the image processing changes as the adjustment of the adaptive optics changes. Different adjustments to the image processing are used to compensate for different errors introduced by different settings of the adaptive optics element. Thus, in this example, the adaptive optics and the image processing are jointly adjusted based on the post-processing performance metric. For example, this process may generate adjusted tap weights for a linear filter, as well as mechanical adjustments to a deformable mirror.

In one specific implementation of FIG. 3, propagation through the imaging system is modeled in a fashion similar to that described in U.S. patent application Ser. No. 11/155,870, "End to End Design of Imaging systems," filed Jun. 17, 2005 by M. Dirk Robinson and David G. Stork, which is incorporated herein by reference. The observed image y after propagation through the optics (including adaptive optics) and the image capture device is given by:

$$y = H(\Theta)s + n, \quad (1)$$

where the operator H is a linear characterization of the optics and the image capture device, s is the image captured under ideal conditions (e.g., an ideal geometric projection of the original object) and n is the random noise associated with the two subsystems. Note that H is a function of $\Theta$, and may be determined in part by use of the probe object. Eqn. 1 above is entirely analogous to Eqn. 10 in U.S. patent application Ser. No. 11/155,870, which contains a further description of the various quantities in the equation and their derivation and is incorporated herein by reference.

The goal of the image processing is to provide an estimate ŝ of the ideal image that is as "close" as possible to the ideal image s. One form of image processing is linear image processing. These are generally simple to analyze formally and easy to implement in an actual system. In the linear framework, the original signal is estimated using a linear operator of the form:

$$\hat{s} = Ry \quad (2)$$

where R is a linear filter.

In this example, the minimum mean square error (MMSE) is used as the Lyapunov or target function. Referring to FIG. 1, the imaging system 100 is optimized such that the sum of the squared deviations between an ideal image 155 and the actual digital image 180 is minimized. Here, the ideal image is the bandlimited, noise-free digital image that would arise from a theoretical pinhole imaging system with sufficient illumination and in the absence of diffraction. Thus, for a fixed set of compensation parameters $\Theta$, the image processing filter is chosen to satisfy $$\min_R \varepsilon_{n,s}[\|Ry - s\|^2], \quad (3)$$

where the subscript of the expectation operator $\varepsilon$ represents an expectation taken over the random noise n and the (assumed) stationary random signal s. The MMSE filtering approach requires no assumptions about the statistical properties of the underlying signal or noise models other than their respective means and covariance structures. Under the assumption that the noise and the signal are uncorrelated, the ideal linear restoration matrix is given by $$R = C_s H^T [H C_s H^T + C_n]^{-1} \quad (4)$$

where $C_s$ and $C_n$ represent the covariance matrices of the signal and the noise respectively. The per-pixel MSE performance is predicted by such a system using $$MSE(\Theta, R) = (1/N) Tr[(RH-I) C_s (RH-I)^T + R C_n R^T]. \quad (5)$$

where N is the number of pixels and Tr[ ] is the trace operator.

A variety of techniques exist for measuring the optical characteristics of a given optics. One simple approach to estimating both the PSF and the noise characteristics involves repeated measurements of an ideal point object (also known as the star test) at several points across the image field. Averaging the Fourier transforms of these point objects offers an estimate of the PSF and hence the optical transfer function (OTF). The probe object can be used to estimate random or unpredictable components of the PSF or OTF, for example the effects of atmospheric turbulence. Furthermore, the noise covariance matrices may be also be estimated in flat or dark test regions, or by using other more sophisticated conventional approaches such as those described in Glenn Healey and Raghava Kondepudy, "Radiometric CCD camera calibration and noise estimation," *IEEE Transactions on Pattern Analysis and Machine Intelligence*, 16(3):267-276, 1994, which is incorporated herein by reference.

Regardless of the approach for characterizing H and $C_n$, once these terms are characterized, the ideal set of optical compensators $\Theta$ and image processing filter R can be chosen to minimize the predicted RMSE of Eqn. 5.

Utilizing nonlinear restoration techniques widens the space of possible post-processing performance metrics. For instance, the class of nonlinear iterative restoration techniques is often statistically motivated, such as Maximum Likelihood (ML) or Maximum A-Posteriori (MAP). Such approaches have the benefit of being asymptotically unbiased with minimum error variance, which are stronger properties than MMSE.

For instance, assuming that the signal s is a deterministic, yet unknown signal, the ML estimate of the signal satisfies $$\hat{s} = \max_s L(y|s), \quad (6)$$

where $L(y|s)$ is the statistical likelihood function for the observed data. Since it is assumed in this particular example that the additive noise in the signal model is Gaussian, the ML cost function reduces to a least squares (LS) objective function $$\hat{s} = \min_s \|y - Hs\|^2 \quad (7)$$
$$= [H^T H]^{-1} H^T y.$$

For signals of large dimension (i.e. large numbers of pixels), it may become prohibitive to explicitly construct these matrices. Often, iterative methods are utilized to minimize Eqn. 7 eliminating the need to explicitly construct the matrices. In many situations, the operator H is rank-deficient leading to unstable solutions. In such cases, additional information, such as object power spectral density information or object functional smoothness, can be used to constrain the space of solutions.

When statistical prior information exists about the unknown signal, the MAP cost function becomes $$\hat{s} = \min_{s} \|y - Hs\|^2 + \psi C(s) \quad (8)$$

where C(s) represents the prior information about the unknown signal and ψ represents a Lagrangian-type relative weighting between the data objective function and prior information. Cost functions of this form may not permit analytic solutions. The Cramer-Rao inequality could be used to bound as well as predict asymptotically the nonlinear estimator performance.

Figure 4:
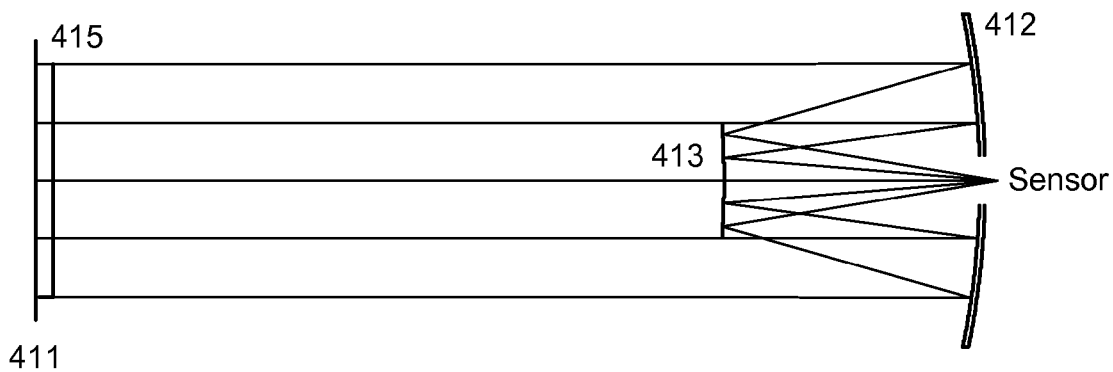
FIG. 4 is a diagram of a telescopic imaging system with transmissive adaptive optics.

The adjustment approach described above is now applied to a specific example using a simulated telescopic imaging system. FIG. 4 shows an example of a simple telescope device. The optics includes a refractive lens 411 followed by two reflective mirrors 412, 413. The telescopic imaging system by itself is capable of diffraction-limited imaging.

An adaptive optics element (in this case a LC-SLM) 415 is located directly after the primary refractive element 411 for the purpose of adjusting the incoming wavefront. The adaptive optics element is assumed to have the constraint that the difference in phase between neighboring regions in the AO element cannot exceed 3 microns or about 6 waves of separation in the visible spectrum, and the total phase cannot be adjusted by more than 5 microns or 10 waves of separation.

When the light collected by an imaging system has passed through large optical distances (e.g., in the case of astronomical or terrestrial telescopic imaging, random variations in the air's refractive index produce random wavefront disturbances which can significantly blur the captured images. Adaptive optics elements can be used to help correct these random fluctuations. However, in these cases, the optical aberrations typically are not well defined by low-order polynomial functions. Rather, the random fluctuations of turbulent media contain both low order and high-order wavefront error functions best described by Zernike polynomials. In this simulation, these random wavefront errors are simulated by drawing Gaussian random variables for the first 9 Zernike modes.

Figure 5A:
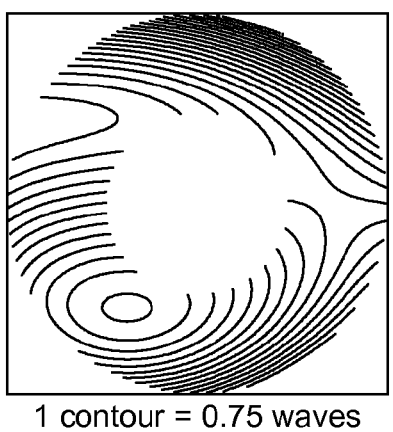
FIGS. 5A and 5B show wavefront error and corresponding MTF for the imaging system of FIG. 4, without adaptive optic correction.
Figure 5B:
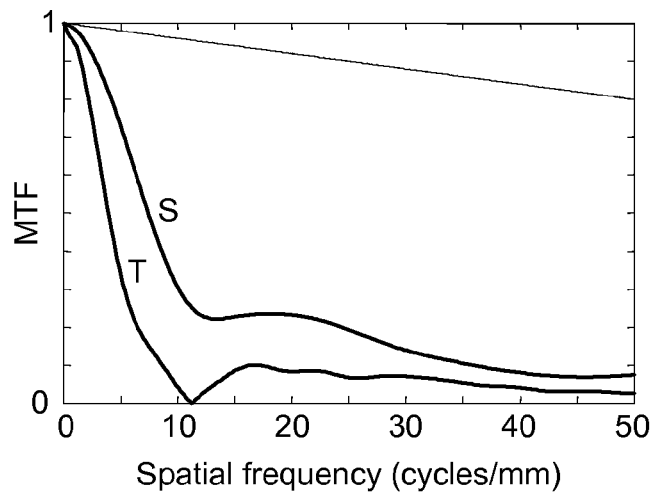

These random wavefront disturbances significantly reduce the contrast of the captured images. For example, FIG. 5A shows the wavefront error function for the telescopic imaging system due to random fluctuations, but without any adaptive optics correction. The wavefront has a peak-to-valley error (OPD-PV) of approximately 18 waves. FIG. 5B shows the degraded MTF curves resulting from this random wavefront aberration. The system suffers from a severe loss in resolution.

Figure 6A:
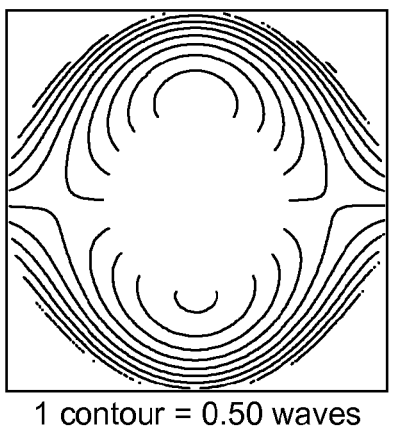
FIGS. 6A and 6B show wavefront error and corresponding MTF using conventional AO control based on RMS wavefront error.
Figure 6B:
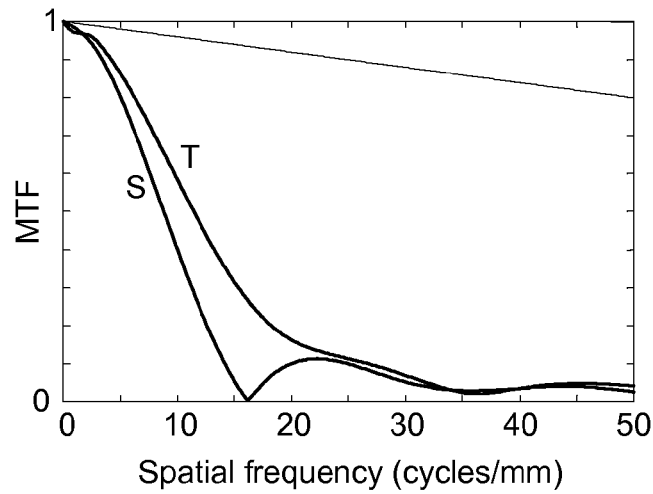

Employing conventional AO control (i.e., attempting to minimize the RMS wavefront error) produces the wavefront error and MTF curves shown in FIGS. 6A and 6B, respectively. The system shows significantly reduced wavefront error down to about 8 waves (OPD-PV), but there is still a fair amount of residual wavefront error. This is because the AO element does not have enough dynamic range to fully compensate for the wavefront error. The MTF in FIG. 6B shows improved contrast over the uncorrected system. However, the system still suffers from zero-crossings where the information is irretrievably lost.

Figure 7A:
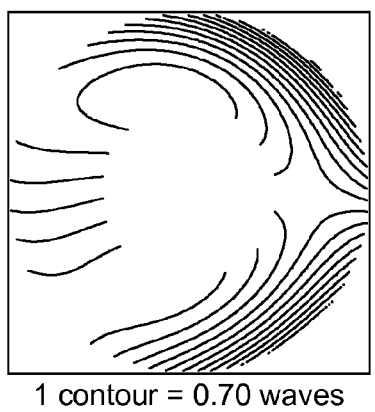
FIGS. 7A and 7B show wavefront error and corresponding MTF using AO control based on MSE of processed images.
Figure 7B:
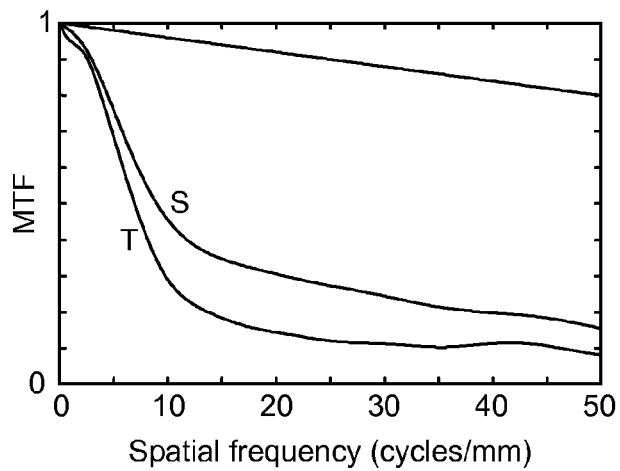
Figure 8:
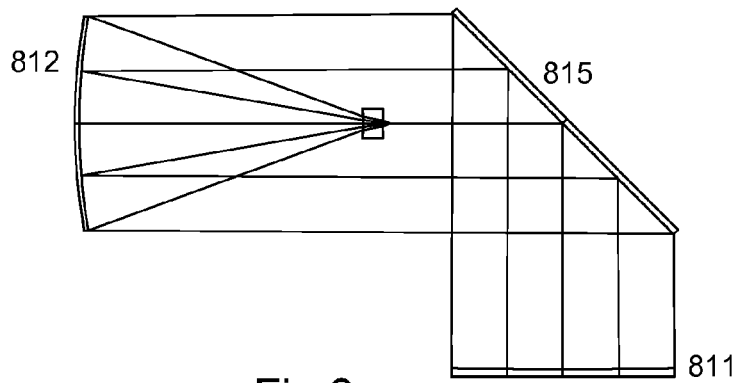
FIG. 8 is a diagram of another telescopic imaging system with reflective adaptive optics.
Figure 9A:
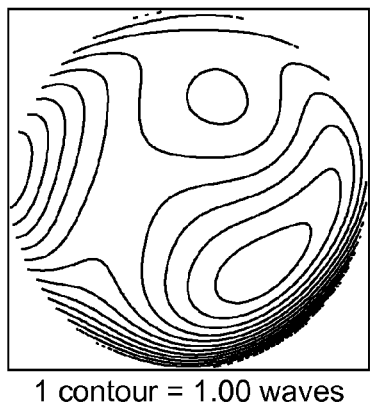
FIGS. 9A and 9B show the wavefront error and corresponding MTF for the imaging system of FIG. 8, without adaptive optic correction.
Figure 9B:
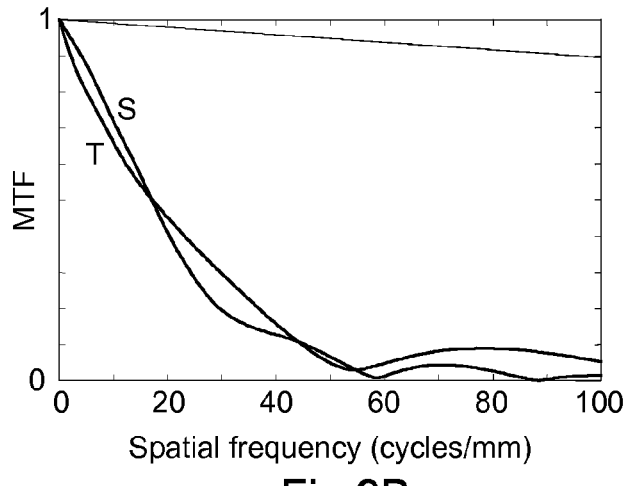

FIGS. 7A and 7B show the wavefront error and MTF curves for AO control according to one aspect of the invention. Here, the MSE cost function is used to drive the AO element instead of the conventional RMS wavefront error. The resulting system is capable of restoring low contrast content at all frequencies using image processing since there are no zero-crossings. Note that FIG. 7A shows significantly larger wavefront error than the conventionally corrected FIG. 6A, approximately 12 waves of OPD-PV error versus approximately 6 waves of OPD-PV error for the wavefront error minimizing case. Note also that the MTF in FIG. 7B does not have any zero-crossings.

FIGS. 8-11 show a second example using a reflective AO device 815 in a Schmidt telescope. The telescope includes a primary lens 811 and primary reflector 812. The AO device 815 is a deformable mirror where the local curvature of the mirror membrane is limited to a separation between neighboring actuators of 1 micron. The maximum stroke of each actuator is 8 microns. FIGS. 9A and 9B show the wavefront error and MTF for the telescopic imaging system due to random fluctuations, but without any adaptive optics correction. This system suffers from a severe loss in resolution.

Figure 10A:
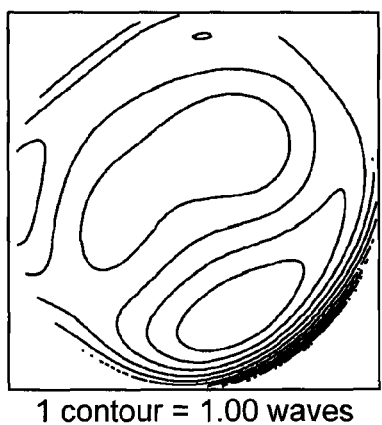
FIGS. 10A and 10B show the wavefront error and corresponding MTF using conventional AO control based on RMS wavefront error.
Figure 10B:
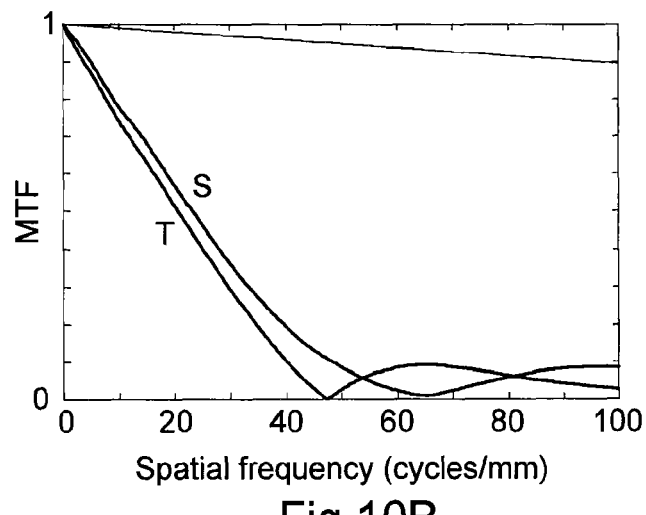
Figure 11A:
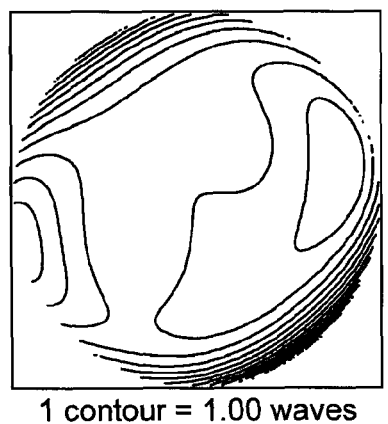
FIGS. 11A and 11B show the wavefront error and corresponding MTF using AO control based on MSE of processed images.
Figure 11B:
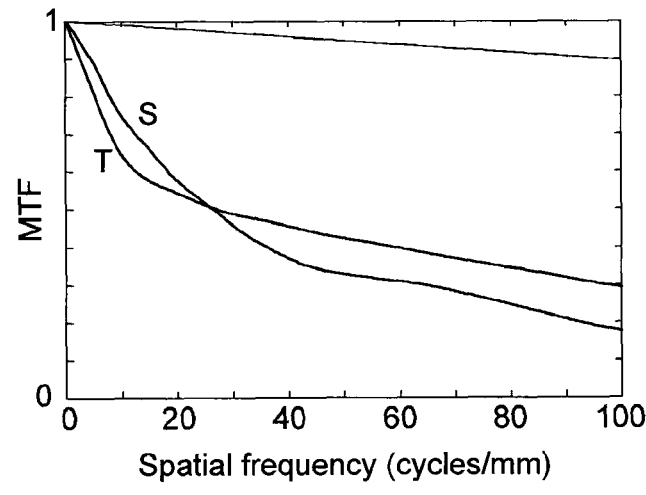

FIGS. 10A and 10B show the wavefront error and MTF using conventional AO control (i.e., AO control that minimizes the RMS wavefront error). FIGS. 11A and 11B show the wavefront error and MTF for AO control driven by an MSE cost function rather than conventional wavefront error. In this example, the conventional AO control (FIG. 10) reduces the OPD-RMS from 2.6 waves down to 1.4 waves of error. The MSE-optimal AO control (FIG. 11) has 2 waves of OPD-RMS, but has significantly better contrast up to the sampling rate of the system (100 lp/mm) with no zero-crossings.

In an alternate approach, the image processing system combines multiple short exposure images. The detector captures multiple images using different AO settings. The image processing combines these images to produce a single "composite" image. The effective MTF for the composite image is thus based on the individual MTFs for the different AO settings. In this case, the AO control optimizees the AO device for each short exposure such that the collection of short exposures together contain the maximal amount of information.

Figure 12:
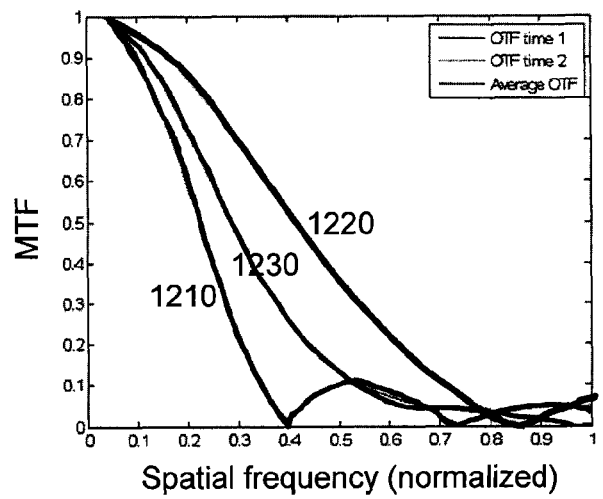
FIG. 12 shows an example of combining multiple MTFs.

FIG. 12 shows an example. Curve 1210 is the MTF taken for a first AO setting. For example, the AO device might be controlled to optimize the MSE for this setting. Even after optimization, the MTF 1210 contains a zero-crossing. The AO device is then set to maximize contrast at the spatial frequencies where there are zero-crossings in the first exposure 1210. Curve 1220 is the MTF for this second exposure. Controlling the AO device in this fashion might produce an MTF 1220 which looks worse, or contains other zero-crossings, but the combination of the two images produces an effective MTF 1230 that contains signal information at all spatial frequencies.

Figure 13:
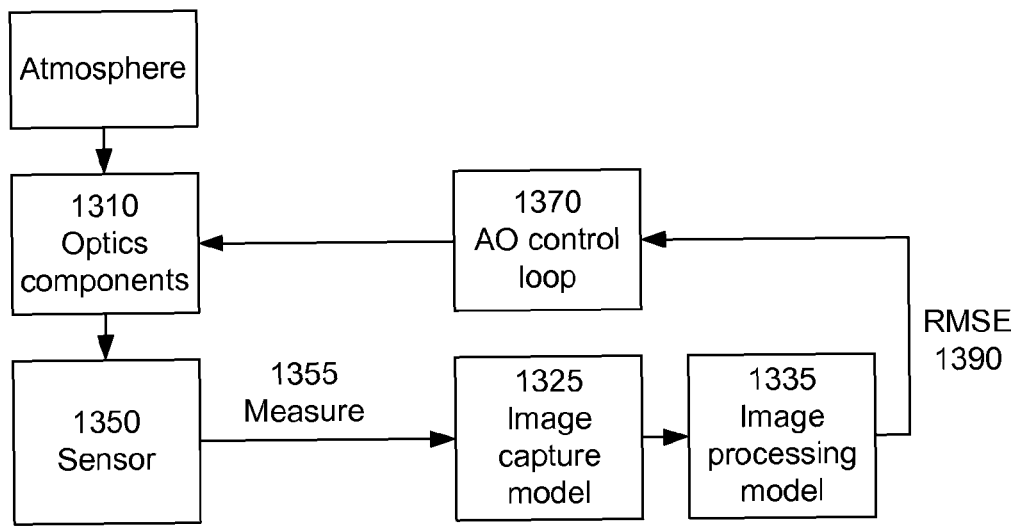
FIGS. 13-15 are block diagrams of example implementations of the AO control method according to the invention.
Figure 14:
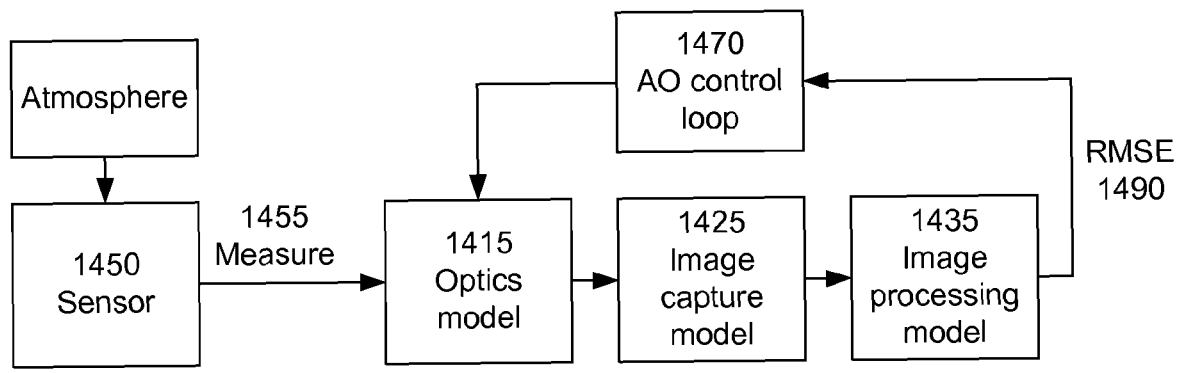
Figure 15:
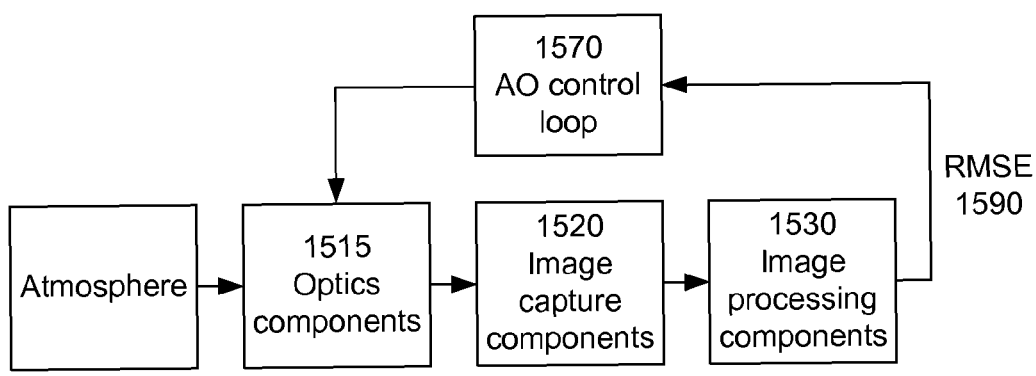

The AO control approach described above can be implemented in many different ways. FIGS. 13-15 illustrate some examples. In these figures, the term "components" will be used to refer to the actual physical components whereas "model" will be used to refer to a model or simulation of the components. Thus, the term "optics components" means the actual lenses, mirrors, etc. as physically built in hardware and the term "optics model" means a model or simulation of these elements, for example as implemented in software. The term "atmosphere" will be used to refer to the aberrations introduced by atmospheric fluctuations, although it should be understood that adaptive optics can be used to compensate for the effects of other random media as well.

FIG. 13 is an implementation based on physical measurements of the optics but models of the image capture device and image processing. In this example, light propagates through the atmosphere and the physical optical components 1310. The result is captured by a sensor 1350, for example by a wavefront sensor. This intermediate result 1355 is used to further model propagation through the image capture device 1325 and image processing 1335. Thus, propagation through the entire imaging system is determined and a post-processing performance metric 1390 can be calculated. Note that the propagation is partially real and partially simulated by models. A feedback loop 1370 controls the AO element in the optics in an attempt to optimize the performance metric 1390.

In FIG. 14, more of the optimization loop is based on models. The optical effects are divided into two groups. The predictable effects (e.g., MTF of the optical system) is simulated by a model 1415. The unpredictable effects (e.g., atmospheric turbulence) are measured. The entire imaging system can be modeled using the measured turbulence effects 1455, coupled with the models 1415, 1425, 1435 of the other components. The feedback loop 1470 adjusts "virtual AO parameters" in the optics model 1415 based on the performance metric 1490. The real AO element is controlled to match the optimized setting determined in the optics model.

In FIG. 15, the opposite approach is taken. The entire optimization loop is based on the physical components. Propagation through the electro-optic imaging system is determined based on a physical object that propagates through the atmosphere, illuminates the optics 1510, is captured by the image capture device 1520 and then processed by the image processing 1530. The output of the image processing components is used to calculate the performance metric 1590, which is then used by the feedback loop 1570 to control the AO element. FIGS. 13-15 are just some examples; other implementations will be apparent.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A method for controlling adaptive optics in an imaging system, the imaging system including optics with an adaptive optics element, an image capture device and image processing, the adaptive optics element adjustable to make real-time adjustments of a phase of an optical wavefront in the imaging system, the method comprising:
   determining propagation of an object through the optics, the image capture device and the image processing; and
   controlling the real-time adjustment of the phase of the optical wavefront by the adaptive optics element, based directly on a post-processing performance metric that is a function of the determined propagation, wherein the optical wavefront suffers from a phase error, but the real-time adjustment of the optical wavefront by the adaptive optics element does not impart a conjugate of the phase error.

2. The method of claim 1 wherein the step of controlling the adaptive optics element is performed without requiring a direct minimization of wavefront error.

3. The method of claim 2 wherein the optics form an intermediate optical image that is significantly worse in image quality than that formed by the optics when the adaptive optics element is controlled to minimize wavefront error.

4. The method of claim 1 further comprising adjusting the image processing based directly on the post-processing performance metric.

5. The method of claim 1 wherein the step of determining propagation of an object through the optics comprises a guide object illuminating actual optics.

6. The method of claim 1 wherein the step of determining propagation of an object through the optics comprises:
   determining a model of the optics; and
   determining propagation through the optics based on the model.

7. The method of claim 1 wherein the step of determining propagation of an object through the optics, the image capture device and the image processing is based on a spatial model of the object.

8. The method of claim 7 wherein the spatial model of the object includes a two-dimensional power spectral density function.

9. The method of claim 1 wherein propagation through the optics and image capture device is determined based on a model y=Hs+n, where y is an image of the object after propagation through the optics and the image capture device, s is an ideal sampled image of the object, H is a sampled point spread function accounting for both the optics and the image capture device, and n is noise.

10. The method of claim 1 wherein the post-processing performance metric is a mean square error between an ideal image of the object and an image predicted by the determined propagation of the object through the optics, the image capture device and the image processing.

11. The method of claim 1 wherein the adaptive optics element is further controlled based on an MTF of the optics.

12. The method of claim 1 wherein:
   the step of determining propagation of an object comprises determining propagation of the object through the optics at various settings of the adaptive optics element, the image capture device capturing a set of images for the various settings, the image processing combining the set of captured images into a composite image; and
   the step of controlling the adaptive optics element comprises controlling the adaptive optics element based directly on a post-processing performance metric that is a function of the set of captured images.

13. The method of claim 1 wherein the optical wavefront suffers from a phase error, but the adaptive optics element does not have enough range to fully correct the phase error.

14. A device for controlling adaptive optics in an imaging system, the imaging system including optics with an adaptive optics element, an image capture device and image processing, the adaptive optics element adjustable to make real-time adjustments of a phase of an optical wavefront in the imaging system, the device comprising:
   means for determining propagation of an object through the optics, the image capture device and the image processing; and
   means for controlling the real-time adjustment of the phase of the optical wavefront by the adaptive optics element, based directly on a post-processing performance metric that is a function of the determined propagation, wherein the optical wavefront suffers from a phase error, but the real-time adjustment of the optical wavefront by the adaptive optics element does not impart a conjugate of the phase error.

15. An imaging system comprising:
   optics that forms an image of an object;
   an image capture device that captures the image formed by the optics;

image processing that processes the captured image;

wherein the optics includes an adaptive optics element and a controller, the adaptive optics element adjustable to make real-time adjustments of a phase of an optical wavefront in the imaging system, the controller controlling the real-time adjustment of the phase of the optical wavefront by the adaptive optics element based directly on a post-processing performance metric that is a function of a determined propagation of the object through the optics, the image capture device and the image processing, wherein the optical wavefront suffers from a phase error, but the real-time adjustment of the optical wavefront by the adaptive optics element does not impart a conjugate of the phase error.

16. The imaging system of claim 15 wherein the adaptive optics element comprises a deformable mirror.

17. The imaging system of claim 15 wherein the adaptive optics element comprises a deformable surface.

18. The imaging system of claim 15 wherein the adaptive optics element comprises a spatial light modulator.

19. The imaging system of claim 15 wherein a control loop for the adaptive optics element does not include a wavefront sensor for directly sensing the optical wavefront.

* * * * *